Aug. 15, 1933.    R. R. ROEMER    1,922,747
CONSTRUCTION SHORE
Filed Jan. 25, 1929
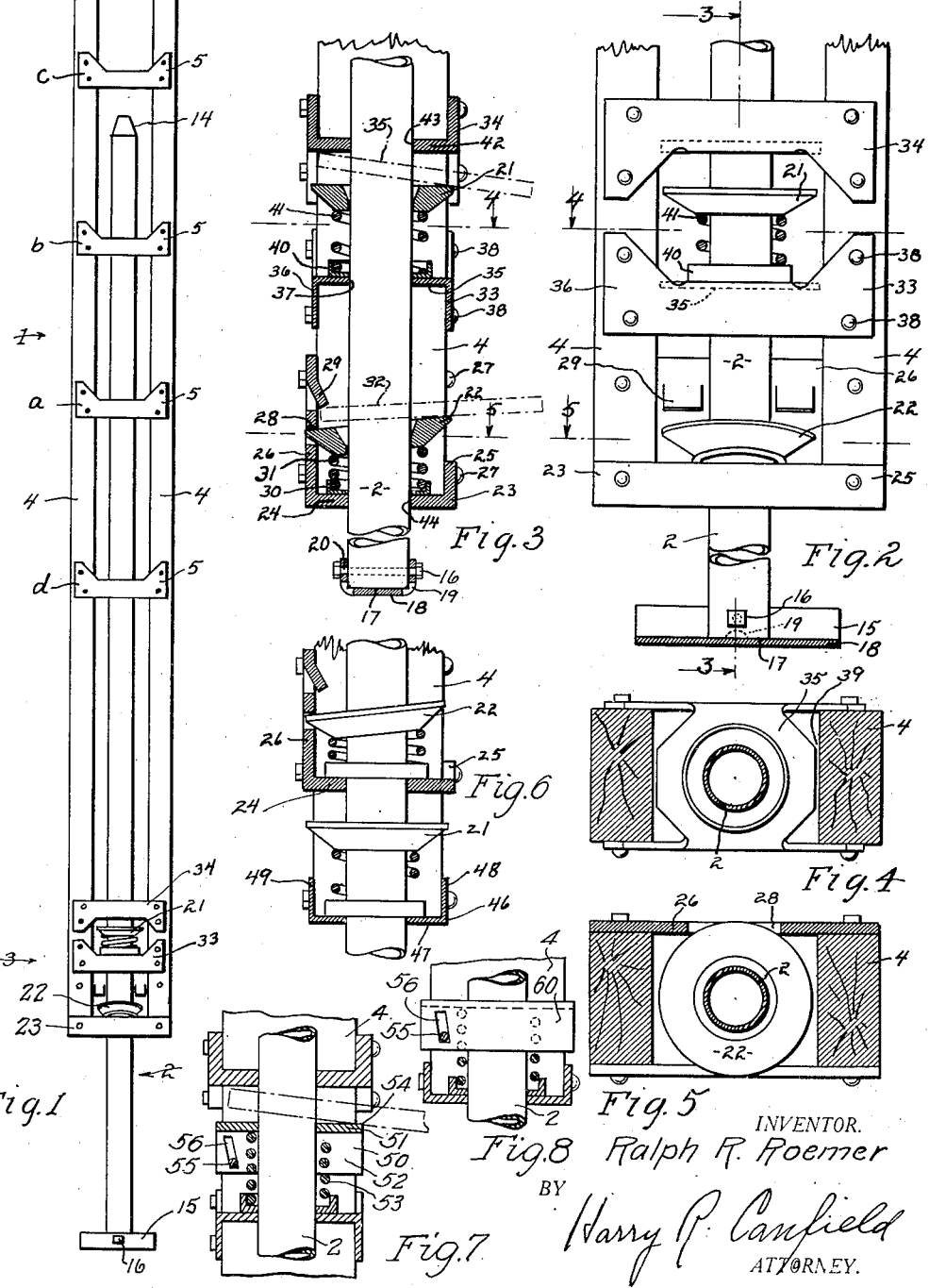
INVENTOR.
Ralph R. Roemer
BY
Harry R. Canfield
ATTORNEY.

Patented Aug. 15, 1933

1,922,747

UNITED STATES PATENT OFFICE 1,922,747

CONSTRUCTION SHORE

Ralph R. Roemer, Cleveland, Ohio

Application January 25, 1929. Serial No. 335,048

37 Claims. (Cl. 254—106)

This invention relates to adjustable construction shores and particularly to that type of shore comprising two longitudinally telescopic shore members, and a clutch device for adjusting the over-all length of the shore and for locking the shore members together at any adjusted length.

One of the objects of this invention is to provide an adjustable shore of this class which will be cheap to manufacture and easy to assemble, and which will have the maximum of strength for the minimum of weight and quantity of material.

Another object is to provide a shore of this class composed of simple structural parts, those which are of metal being adaptable to fabrication from bars, sheets, rods, etc., whereby they may rapidly be produced at the minimum of cost.

Another object is to provide a shore having two longitudinally telescopic members one of which is adapted to reinforce the load carrying capacity of the other in an improved manner.

Another object is to provide, in a shore having two braced wood struts for one of the telescopic members, an improved tie or brace for said members.

Another object is to provide, in a shore of the type having a canting plate or plates in the clutch device for adjusting the over-all length of the telescoping shore members and for locking them together at any adjusted length, an improved construction for supporting and protectively enclosing the plate or plates.

Another object is to provide an adjustable shore of the class described having two canting plates, one for adjustably shortening the length of the shore and for locking the shore at any adjusted length, and one for adjustably lengthening the shore, of which the former is or may be floating or rotatable around the axis of the shore and composed of high grade, wear resisting material, and the latter may be cheaply made from standard rolled sections of cheaper material and anchored or pivoted on the shore against rotation.

Another object is to provide an adjustable shore in which the cap in direct contact with the load may be simply, quickly and cheaply increased in dimensions to adapt it to special or variable conditions.
Another object is to provide in a shore in which one of the telescoping members is tubular or circular in section, an improved foot therefor for supporting the shore when under load and to operatively assist in adjustably increasing the length of the shore.

Another object is to provide an adjustable shore having a spring pressed canting plate or ring or washer for adjustably shortening the shore or for supporting the load on the shore and which may be adapted to prevent accidentally untelescoping or lengthening the shore when being shipped or handled.

Other objects will be apparent to those skilled in this art.

In some respects the subject matter of this application is a continuation of the subject matter of my pending applications Ser. No. 205,357, filed July 13, 1927; Ser. No. 304,885, filed September 10, 1928; and Ser. No. 305,394, filed September 12, 1928 patented Feb. 2, 1932 as Patent No. 1,843,631.

In the drawing,

Fig. 1 is an elevational view of the shore embodying my invention and showing the shore in the upright position in which it is ordinarily used;

Fig. 2 is a fragmentary view showing part of the shore of Fig. 1 drawn to a larger scale and partly in section;

Fig. 3 is a sectional view taken from the plane 3 of Fig. 2;

Fig. 4 is a sectional view taken from the plane 4 of Fig. 2 with a spring which I employ omitted;

Fig. 5 is a sectional view taken from the plane 5 of Fig. 2 or Fig. 3;

Fig. 6 is a view similar to Fig. 3 but showing a modification;

Fig. 7 is a view similar to Fig. 3 but showing a modification;

Fig. 8 is a view similar to Fig. 6 but showing another modification.

Fig. 9 is a view of a part of Fig. 1 showing an accessory cap element which I may employ.

Referring to the drawing, I show at 1, in general, the upper one of a pair of telescopic shore members; at 2, in general, the lower telescopic member of the pair; and at 3, in general, a clutch device.

The upper telescoping shore member, 1, comprises two vertically arranged struts, columns or the like, 4—4, preferably of wood, spaced apart, as shown, and braced by a series of braces, 5—5, to be described, surmounted by a head or cap, 6, preferably of wood and secured to the struts, 4, by angle pieces, 7, and a channel piece, 8, and bolts, 9.

In the extreme ends of the cap are two bolt holes, 10, by means of which an auxiliary cap, 11, shown in Fig. 7, having corresponding holes, 12, registerable with the holes, 10, may be superimposed on the cap, 6, and by means of bolts, 13, passing through the registered holes, may be secured to the cap, as shown in Fig. 7. By this construction the cap, ordinarily supplied with the shore, when manufactured may conveniently and cheaply be increased in horizontal length to suit any special conditions of use.

The lower telescoping shore member, 2, is preferably tubular, as shown, and of circular cross section. The upper end is, preferably, slightly tapered or pointed, as at 14, to facilitate its threading through suitable perforations in the braces, 5, to be described. The lower end is provided with a horizontal foot, 15, pivotally secured thereto by the bolt, 16.

The foot, 15, is preferably made from a piece of sheet or bar steel bent into channel form, as shown. To facilitate its manufacture the inner corners of the channel are bent round to a convenient radius. It is desirable that the lower end, 17, of the tubular member, 2, shall be squared off at right angles to its axis and that such squared end shall rest flat upon the web, 18, of the channel form foot. Therefore, the inside rounded corners of the channel opposite the end of the tubular member are, preferably, removed to give clearance for the tubular member by means of two perforations, 19—19, made in the plate, preferably before being bent into the channel. The perforations, 20—20, by means of which the channel is pivotally bolted to the tubular member, are also preferably punched in the plate before bending it. By this construction, a cheap but strong and durable foot is provided upon which the lower shore member may squarely stand when the lower shore member is at right angles to the ground or supporting surface; and by allowing some clearance in the perforations 20 around the bolt 16, the foot may pivot on the bolt or rock from side to side thereon to adjust the position of the foot on the tubular member when the ground or supporting surface is not horizontal or not at right angles to the tubular member.

The clutch device, 3, comprises a normally uncanted canting plate or washer, 21, and a normally canted canting plate or washer, 22, encircling or surrounding the tubular member, 2. These canting plates and their functions of supporting the load of the shore, and transferring it from the upper shore member to the lower shore member and the functions of adjustably changing the overall length of the shore are fully described in my aforementioned application, Serial Number 304,885; and the preferred form of the canting plate or washer is fully described in my aforesaid application, Serial Number 305,394. In the instant application a simplified and cheapened form of construction of shore is disclosed by which these functions of the canting plates may be performed advantageously and efficiently.

Referring to Figs. 2 to 5 inclusive, the lower ends of the two wood struts, 4—4, abut upon and rest or are cradled in a combined tie member or saddle, 23, which, in the form shown, comprises a bottom plate, 24, preferably rectangular, and perforated to permit the passage therethrough of the tubular member, 2, and having a vertical front flange, 25, and a vertical back piece, 26, all preferably integral. Bolt, 27, may be passed through the saddle and struts to secure them rigidly together. An aperture, 28, elongated in the horizontal dimension, is provided in the back piece, 26, and two lugs or tongues, 29, are provided, bent inwardly from the back piece, 26, for purposes to be described. Between the two struts, 4—4, and resting on the bottom plate, 24, of the saddle and encircling the tubular member, 2, are successively mounted a cup-shaped washer, 30, a spring, 31, and the canting plate, 22. The edge of the plate projects into the aperture, 28, and the compression spring, 31, reacting between the washer, 30, and the lower side of the plate, 22, holds it upwardly, rocked around the edge of the aperture, 28, in a normally canted position. The weight of the struts, 4—4, and the load thereon, as will now be understood, is transferred to the saddle, 23, thence to the plate, 22, and thence to the lower shore member, 2. To adjustably shorten the shore a simple bar as a lever may be placed, as shown in broken lines at 32 in Fig. 3, with one end under one of the lugs, 29, and resting on the plate 22, and the parts just described are so positionally related that the bar will rest upon the front or uppermost edge of the plate; and by depressing the other end of the bar, the plate will be thereby uncanted and the shore may be shortened.

Referring again to Figs. 2 to 5 inclusive, immediately above the saddle, 23, are two similar braces or tie members, 33 and 34. The tie member, 33, comprises the horizontal web, 35, perforated at 37 to receive the tubular member, 2. Preferably integral with the web, 35, as when formed from a single piece of sheet metal, are two vertical flanges, 36, the latter being parallel and spaced equal to the width of the struts, 4, so that their inner faces just span the struts, and bolt, 38, may be passed through the two flanges and through the struts. The flanges serve to brace and tie the struts. The web 35, may touch the inner faces of the struts, as at 39, (Fig. 4) to permit ease and uniformity of assembling, but is preferably not secured to the struts.

The tie or brace, 34, is similar to the brace, 33, just described, except that it is positioned upside down with respect thereto and is made of thicker material.

Resting on the upper surface of the web, 35, of the tie or brace, 33, are successively mounted, surrounding or encircling the tubular member, 2, a cup-shaped washer, 40, a spring, 41, and the canting plate or washer, 21. The spring supports the canting plate horizontally or in an uncanted position. The upper face of the canting plate, 21, and the lower face of the web, 42, of the tie or brace, 34, are so positionally related that a simple straight bar as a lever may be inserted therebetween, as shown in broken lines at 35 in Fig. 3 with one end against the web and with the bar lying on the upper edge of the plate, 21. When the other end of the lever is depressed, the canting plate, 21, will thereby be canted and will grip the tubular member, 2, and further depression of the lever will cause it to fulcrum around the edge of the plate and by the upward thrust on the web, 42, will adjustably lengthen the shore.

As will be seen by the drawing, the space between the upper surface of the canting plate, 22, and between the tubular member, 2, and either of the struts, 4—4, forms a pocket or receptacle for guiding the end of the lever, 32, to its seat under the lug, 29, and, similarly, the space between the upper surface of the canting plate, 21, and the lower surface of the web, 42, and between the tubular member, 2, and either of the struts, 4—4, forms pockets or passages or apertures for guiding the end of the lever, 35, into position for operating it, as above described.

The spring, 31, which normally holds the canting plate, 22, in a canted position, is preferably so made and adapted to so engage the plate as to exert thereon more force than is merely required to cant it, to produce friction between the inner, circular edge of the plate and the tubular member, 2, distinct from that produced by the load on the plate from the saddle, 23, for the following purpose. When the shore is being transported or installed, if it is supported by the upper shore member, 1, the said frictional contact if suitably provided, as above mentioned, will prevent the lower or tubular member, 2, from escaping and sliding downwardly out of the upper member, 1, as it otherwise might do. Thus the canting plate, 22, jointly with the spring, 31, performs a function additional to its load-carrying function. When the shore is being installed and it is desired to lengthen it by hand, the operator may stand the shore vertically, and place one foot on the shore foot, 15, and shove upwardly on the upper shore member, 1. This will be sufficient to overcome the holding friction, just described, of the canting plate, 22.

It will be apparent that, as above described, the anchoring of the two wood struts, 4—4, in the saddle, 23, will transmit to the saddle the load applied to both struts. Also by locating the aperture, 28, in the saddle back plate, 26, approximately midway between the wood struts, 4—4, the canting plate, 22, in said aperture will receive the load equally from both struts in substantial balance, which contributes materially to the strength of the shore. By providing a relatively heavy tie or brace, 34, and by providing a close fitting hole or perforation, 43, in the web, 42, thereof, and also a close fitting perforation, 44, in the bottom plate, 24, of the saddle, the advantages of two spaced holes, closely fitting the tubular member, 2, described in my aforesaid application, Serial Number 304,885, may be had. The web, 42, of the tie or brace, 34, is also, preferably, relatively heavy to withstand the upward thrust of the lever, 35, when adjustably lengthening the shore.

The tie or braces, 5—5, are preferably made uniform with the tie or brace, 33, for economy of production. Preferably, the perforations, 37, therein are somewhat larger than the perforations 44, and 43, in the saddle, 23, and tie or brace, 35, to permit the tubular member, 2, to slide freely therethrough. However, these perforations are not so large but that the clearance between the edges of the perforations and the tubular member will be small enough to cause the webs, 35, to move over laterally into contact with the tubular member when the wood struts, 4—4, have been slightly deflected or warped out of their normal rectilinear condition by the application of relatively great load. By this provision, the tendency of the wood struts to yield under load is counteracted by, and, in effect, the wood struts, 4—4, themselves, are reinforced by the tubular member, 2. I have found by practice and by laboratory tests of my improved shore that the maximum load-supporting capacity which may thus be obtained, may be still further increased by a particular distribution of a number of such ties or braces, 5, over the longitudinal length of the wood struts, 4. As will be understood, there are many variable quantities to be taken into account, such as the length of the wood struts and the extent of elongation of the shore and the cross sectional shape and area of the struts, and the number of ties or braces employed; and, therefore, the exact dimensional location cannot be determined for every possible construction. But, as a general law, I have found that the maximum strength is obtained when one tie or brace, as $a$ in Fig. 1, is placed at approximately midway of the two ends of the wood struts, 4—4; and the upper half of the wood struts, thus determined, is divided up into approximately equal spaces by other ties or braces, such, for example, as three equal spaces by two ties or braces $b$ and $c$, as shown in Fig. 1; and another tie or brace, $d$, is placed below the middle tie, $a$, at approximately the same distance as the ties $a$, $b$, and $c$ are from each other. It will be observed that a characteristic of this distribution of braces is that the greater part of the bracing is in the upper part of the wood struts and that the center of the braced zone is above the middle of the wood struts.

In Fig. 6 I have shown a modification in which the normally canted canting plate, 22, is above the normally uncanted plate, 21. The operation is the same as that of the other form. In this modification the back plate, 26, and front flange 25, of the saddle overlap both of the wood struts, 4, but the bottom plate, 24, is transversely narrow enough to permit the wood struts to pass on through the saddle to an auxiliary saddle, 46, having a bottom plate, 47, and front and back flange, 48 and 49. The cup-shaped washer, 40, spring, 41, of the normally uncanted canting plate, 21, are supported on the saddle, 46, as shown, and the lower surface of the bottom plate, 24, of the saddle serves as the fulcrum for the lever for canting the plate, 21.

In Fig. 7 is shown a modification in which the uncanted canting plate, 50, is positioned as is the plate, 21, in the form of Fig. 3 but is, itself, of a different type or form. It is, as shown, made of channel form, preferably from a standard rolled steel section having the web, 51, and flanges, 52. The spring, 53, supports the plate by the web, 51. When this form of plate is employed, the lever for canting same (which is to be operated in the same way as with the form of Fig. 3) will function more conveniently if the plate is restrained from rotating around the axis of the shore in order that the edge, 54, of the web upon which the lever fulcrums may always be presented to the lever at right angles thereto. This form of plate, therefore, is preferably anchored by a shaft or pin, 55, extending between and secured to the wood struts, 4, in any suitable manner and passing through registering slots, 56, in the flanges, 52, of the channel, these parts being arranged as shown in Fig. 7. A slot, as shown, is necessary, because when the plate is canted to grip the tubular shore member, 2, and the wood struts are forced upwardly by the lever, the plate, 50, remains with the tubular member, 2, and the pin, 55, travels upwardly with the wood struts, 4.

In Fig. 8 I have shown a modification in which the uncanted canting plate, 60, is positioned as is the plate, 21, in Fig. 6, that is, below the canted plate but in this modification the plate, itself, is of the form shown in Fig. 7.

In connection with both of the modifications of Figs. 7 and 8 I preferably employ a normally canted canting plate of the circular type and floating, that is, free to rotate around the axis of the shore as a whole, such, for example, as those shown in Figs. 1 to 6 inclusive.

My invention is not limited to the exact form or arrangement of the parts involved in the con-

I claim:

1. In an adjustable construction shore, a pair of longitudinally telescopic shore members one of which comprises a single strut element and the other of which comprises a pair of strut elements spaced apart, and a clutch device comprising two canting plates positioned between the two strut elements, adjacent to one end thereof, one of which is normally uncanted and surrounds the single strut element, and the other of which is normally canted and surrounds the single strut element and is rotatable about the axis of the shore with respect to both shore members.

2. In an adjustable construction shore, a pair of longitudinally telescopic shore members one of which comprises a single strut element and the other of which comprises a pair of strut elements spaced apart, and a clutch device comprising two canting plates positioned between the two strut elements, adjacent to one end thereof, one of which is normally canted and the other of which is normally uncanted, and both of which surround the single strut element and are rotatable around the axis of the shore with respect to both shore members.

3. In an adjustable shore, a pair of longitudinally telescopic shore members, one of which comprises a single strut element and the other of which comprises a pair of individual strut elements spaced apart, a saddle element rigidly secured to and connecting the pair of strut elements and adapted to receive from them a load carried severally thereby, a canting plate surrounding and gripping the single strut element and positioned between the pair of strut elements and adjacent to one end thereof, the saddle element being provided with a fulcrum adapted to engage the plate to transfer the said load from the saddle element to the plate and thence to the single strut element.

4. In an adjustable shore, a pair of longitudinally telescopic shore members, one of which comprises a single strut element and the other of which comprises a pair of strut elements spaced apart, a clutch device comprising a canting plate surrounding and gripping the single strut element and positioned between the two strut elements and adjacent to one end thereof, and a saddle element connecting the two strut elements provided with means to space apart the two strut elements, and provided with a fulcrum adapted to engage the plate at a point between the strut elements at a point midway between the strut elements to transfer a load from the two strut elements equally to the saddle and thence to the plate and thence to the single strut element, the saddle being positioned at the extreme end of the said two strut elements and the latter abutting their ends thereupon.

5. In an adjustable shore, a pair of longitudinally telescopic shore members, one of which comprises a single strut element and the other of which comprises a pair of strut elements spaced apart, substantially parallel to each other and to the single strut element and a clutch device comprising a canting plate surrounding and gripping the single strut element and positioned between the two strut elements and adjacent to one end thereof, and a tie element connecting the two strut elements provided with an aperture between the elements into which the edge of the plate extends to transfer a load equally from the two strut elements to the tie element and thence to the plate and thence to the single strut element.

6. In an adjustable shore, a pair of longitudinally telescopic shore members, one of which comprises a single strut element and the other of which comprises a pair of strut elements spaced apart, a clutch device comprising a normally canted canting plate surrounding and gripping the single strut element and positioned between the two strut elements and adjacent to one end thereof, and a tie element connecting the two strut elements and provided with a fulcrum adapted to engage the plate and to transfer to it and thence to the single strut element a load on the two strut elements, the said tie element being also provided with a lever fulcrum, the said fulcrum, plate and lever fulcrum being so positionally related that a simple bar as a lever when placed with one end under the lever fulcrum and lying on the plate may be employed to uncant the plate when the other end thereof is depressed, to permit of adjustably shortening the shore.

7. In an adjustable shore, a pair of longitudinally adjustable shore members, one of which comprises a single strut element and the other of which comprises a pair of strut elements, a clutch device comprising a normally uncanted canting plate surrounding the single element and adapted to grip it when canted, and positioned between the two strut elements and adjacent to one end thereof, a tie element connecting the two strut elements at a point nearer the said end than said plate, and a compression spring surrounding the single strut element, abutting at one end on the plate, to support it in uncanted position abutting at the other end upon the tie member.

8. In an adjustable shore, a pair of longitudinally adjustable shore members, one of which comprises a single strut element and the other of which comprises a pair of strut elements, a clutch device comprising a normally uncanted canting plate embracing the single element and adapted to grip it when canted, and positioned between the two strut elements and adjacent to one end thereof, a first tie element connecting the two strut elements at a point nearer the said end than said plate, a second tie element connecting the two strut elements on the opposite side of the plate from said first tie element, means associated with the first tie element for supporting the plate in an uncanted position, the said second tie element being positionally so related to the plate and first tie element that a simple bar as a lever may be placed with one end under the second tie element and lying on the plate and then employed to cant the plate to cause it to grip the single strut element by depressing the other end of the lever.

9. In an adjustable shore, a pair of longitudinally adjustable shore members, one of which comprises a single strut element and the other of which comprises a pair of strut elements, a clutch comprising a normally uncanted canting plate embracing the single element and adapted to grip it when canted, and positioned between the two strut elements and adjacent to one end thereof, a first tie element connecting the two strut elements at a point nearer the end than said plate, a second tie element connecting the two strut elements on the opposite side of the plate from said first tie element, means associated with the first tie element for supporting the plate in an uncanted position, the said second tie element being positionally so related to the first tie element and plate that a simple bar as a lever when placed with one end under the second tie element and resting on the plate may be employed to cant the plate to cause it to grip the single strut element when the other end of the lever is depressed, and to rock on the edge of the plate as a fulcrum to exert a thrust on the second tie element to move it and the two strut elements to extend the length of the shore.

10. In an adjustable construction shore, a pair of longitudinally adjustable shore members, one of which comprises a single strut element and the other of which comprises a pair of strut elements, a clutch device comprising a normally uncanted canting plate adapted to be canted to grip the single strut element, a normally canted canting plate gripping the single strut element, a first lever-engageable thrust element on the second mentioned shore member adjacent to the uncanted canting plate, means on said shore member for cantably supporting the uncanted canting plate, a second lever-engageable thrust element on the said shore member adjacent to the normally canted canting plate, a plate engageable fulcrum on the said shore member, means on the said shore member for normally canting the normally canted canting plate, said plates, thrust elements and means lying between said two strut elements and adjacent to one end thereof.

11. In a shore having a tubular supporting member squared off on the end, a foot comprising a channel of sheet metal the flanges of which are spaced to span the end of the tubular member and are perforated for a pivot bolt passing through the tubular member, and the two inside corners of which between the channel web and channel flanges are bent round and provided respectively with perforations to receive diametrically opposite portions of the squared off ends of the tubular member when the latter rests upon the web.

12. In a telescopic shore, an inner shore member, an outer shore member by means of which the shore may be lifted to position it in its normally upright position, a normally canted canting plate associated with the outer shore member provided with a gripping edge for gripping the inner member to prevent telescopic shortening of the shore in one direction under load thereon, a spring for normally canting the plate and for causing the gripping edge to frictionally engage the inner member with force sufficient to prevent movement thereof under the action of gravity to telescopically lengthen the shore when the shore is supported vertically by means of the outer shore member except upon the application of force to the inner member in addition to the force of gravity thereon when the shore is lifted by the outer member.

13. In an adjustable shore, a pair of longitudinally telescopic members, one of which comprises a single strut element and the other of which comprises a pair of strut elements spaced apart, a clutch device comprising a canting plate surrounding the single strut element, positioned between the two strut elements and adjacent to one end thereof and rotatable around the axis of both shore members, a transverse tie element connecting the two strut elements at a point nearer their ends than said plate, and a compression spring surrounding the single strut element and extending from the tie element to the plate to cant the plate.

14. In an adjustable shore, a pair of longitudinally adjustable shore members, one of which comprises a single strut element and the other of which comprises a pair of strut elements, a clutch device comprising a normally uncanted canting plate surrounding the single element and adapted to grip it when canted, and positioned between the two strut elements and adjacent to one end thereof, a tie element connecting the two strut elements at a point nearer the said end than said plate, and a compression spring adapted to support the plate and abutting upon the tie member, the spring surrounding the single spring element.

15. In an adjustable shore, a pair of longitudinally adjustable shore members, a device normally preventing relative adjustment in the direction to shorten the shore, a normally uncanted canting plate embracing one member and adapted to grip it when canted, the other member having a lever engageable portion adjacent the said plate whereby a removable bar lever when engaged with the said portion and with said plate may be rocked on the said portion to cant the plate and then rocked on the plate to react on the said portion to increase the length of the shore.

16. In an adjustable shore, a pair of longitudinally adjustable shore members, a device normally preventing relative adjustment in the direction to shorten the shore and comprising a normally canted canting plate gripping one member, the other member having a lever engageable portion adjacent the said plate whereby a removable bar lever when engaged with the said portion and with said plate may be rocked on the portion to uncant the plate to permit the shore to be shortened.

17. In an adjustable shore, a pair of longitudinally adjustable shore members, a device normally preventing relative adjustment in the direction to shorten the shore, and comprising a normally canted canting plate gripping one member, the other member having a lever engageable portion adjacent the said plate whereby a removable bar lever when engaged with the said portion and with the plate may be rocked on the portion to uncant the plate to permit the shore to be shortened, a normally uncanted canting plate embracing the said one member and adapted to be canted to grip it, the said other member having a lever engageable portion adjacent the said uncanted plate whereby a removable bar lever when engaged with the said portion and with said plate may be rocked on said portion to cant the plate and then rocked on the plate to react on the said portion to increase the length of the shore.

18. In an adjustable shore, a pair of longiudinally adjustable shore members, a device normally preventing relative adjustment in the direction to shorten the shore, a normally uncanted canting plate embracing one member and adapted to grip it when canted, the other member having a lever engageable portion adjacent the said plate whereby a removable bar lever when engaged with the said portion and with said plate may be rocked on the said portion to cant the plate and then rocked on the plate to react on the said portion to increase the length of the shore, and the said plate being rotatable around the axis of the shore with respect to both shore members.

19. In an adjustable shore, a pair of longitudinally adjustable shore members, a device normally preventing relative adjustment in the direction to shorten the shore and comprising a normally canted canting plate gripping one member, the other member having a lever engageable portion adjacent the said plate whereby a removable bar lever when engaged with the said portion and with said plate may be rocked on the portion to uncant the plate to permit the shore to be shortened, and the said plate being rotatable around the axis of the shore with respect to both shore members.

20. In an adjustable shore, a pair of longitudinally adjustable shore members, a device normally preventing relative adjustment in the direction to shorten the shore, and comprising a normally canted canting plate gripping one member, the other member having a lever engageable portion adjacent the said plate whereby a removable bar lever when engaged with the said portion and with the plate may be rocked on the portion to uncant the plate to permit the shore to be shortened, a normally uncanted canting plate embracing the said one member and adapted to be canted to grip it, the said other member having a lever engageable portion adjacent the said uncanted plate whereby a removable bar lever when engaged with the said portion and with said plate may be rocked on said portion to cant the plate and then rocked on the plate to react on the said portion to increase the length of the shore, and both of said plates being rotatable around the axis of the shore with respect to both of said shore members.

21. In a construction shore, a pair of relatively longitudinally adjustable shore elements, one element comprising a pair of spaced wood struts, a transverse one-piece sheet metal brace comprising a body portion between the struts in a plane at right angles to the shore axis perforated to embrace the other shore elements, and having portions at right angles to the body portion disposed against the outer faces of the struts and secured thereto.

22. In an adjustable construction shore, a pair of longitudinally telescopic shore members, a clutch device comprising a normally uncanted canting plate surrounding one shore element and adapted to grip it when canted and to then serve as a reaction base upon which a lever may be fulcrumed and engage the other shore member to adjustably lengthen the shore, the said normally uncanted canting plate when in uncanted position being freely rotatable around the axis of the shore with respect to both shore members.

23. In a shore, two members longitudinally relatively movable to adjust the overall length of the shore, a clutch device for locking the two members against relative movement in the direction to shorten the shore, the said device comprising a canting plate having a perforation embracing one of the members, an abutment on the other member, a spring abutting upon the plate and disposed to rock the plate upon the abutment to cant it, the plate engaging the abutment on a generally circular portion of the plate whereby the plate may be rotated in its canted plane without disengaging it from the abutment, and the perforation being circular whereby the plate may be rotated in its canned plane without changing the canted angle and therefore without further compressing the spring.

24. In a shore, two members longitudinally relatively movable to adjust the overall length of the shore, a clutch device for locking the two members against relative movement in the direction to shorten the shore, the said device comprising a canting plate having a perforation embracing one of the members, an abutment on the other member, a helical spring surrounding the embraced member and abutting the plate and disposed to rock the plate upon the abutment to cant it, the plate engaging the abutment on a generally circular portion of the plate whereby the plate may be rotated in its canted plane without disengaging the abutment, and the perforation being circular whereby the plate may be rotated in its canted plane without changing the canted angle and therefore without changing the degree of compression of the spring.

25. In a shore, two members longitudinally relatively movable to adjust the overall length of the shore, a clutch device for locking the two members against relative movement in the direction to shorten the shore, the said device comprising a canting plate having a perforation embracing one of the members, an abutment on the other member, a spring abutting upon the plate and disposed to rock the plate upon the abutment to cant it, the perforation in the plate being circular whereby the plate may be rotated in its canted plane without changing the canted angle and therefore without further compressing the spring.

26. In a shore, two members longitudinally relatively movable to adjust the overall length of the shore, a clutch device for locking the two members against relative movement in the direction to shorten the shore, the said device comprising a canting plate having a perforation embracing one of the members, an abutment on the other member, a helical spring surrounding the embraced member and abutting the plate and disposed to rock the plate upon the abutment to cant it, the perforation being circular whereby the plate may be rotated in its canted plane without changing the canted angle and therefore without changing the degree of compression of the spring.

27. In a shore, two longitudinally relatively movable members, a clutch device for locking the two members against relative movement in one direction, means whereby the members may be moved relatively longitudinally in the other direction including a normally uncanted canting plate surrounding one member and rotatable thereon relatively to both members, and adapted to be canted to grip the member which it surrounds in like manner at all rotated positions thereof.

28. In a shore, two relatively longitudinally movable members, a clutch device including a first canting plate normally canted and engaging one of said members to prevent said relative movement in one direction, an auxiliary canting plate normally uncanted and adapted to be canted to engage one of said members, through the agency of which the said members may be given relative movement in the other direction, both of said canting plates being rotatable relative to both of said members about the axis of the members.

29. In a shore, a pair of telescoping tubular members, one entirely encircling the other, a clutch device comprising a housing on one of the members, a fulcrum on the housing, a first canting plate on the other member adapted to be canted to grip said other member, a resilient element for holding the plate against the fulcrum to cant it, an auxiliary canting plate on said other member adapted to be canted to grip said other member, a resilient element for maintaining it normally uncanted, the said members normally being prevented from relative movement in one direction by said first canting plate, means for moving said members relatively in the other direction, including means for canting said auxiliary plate, and means for uncanting said first canting plate to permit relative movement in said one direction.

30. In a shore, two longitudinally, relatively movable members, a clutch device for locking the two members against relative movement in one direction, means whereby the members may be moved relatively longitudinally in the other direction including a normally uncanted canting plate associated with one of the members and surrounding the other member and rotatable on a longitudinal shore axis relative to both members and adapted to be canted to grip the member it surrounds.

31. In a shore, two longitudinally, relatively movable members, a clutch device for locking the two members against relative movement in one direction, means associated with the inner end of one member and movable with said member whereby the members may be moved relatively longitudinally in the other direction, said means including a normally uncanted canting plate surrounding one member, rotatable on a longitudinal shore axis relative to both members and adapted to be canted to grip the member it surrounds.

32. In a shore, two longitudinally, relatively movable members, a first canting plate surrounding one member, means for normally canting it to cause it to grip said member to prevent relative movement of the member in one direction, an auxiliary canting plate surrounding one of said members, means for maintaining it normally uncanted, the auxiliary canting plate being adapted to be canted to grip the member it surrounds and in its canted position being adapted to serve as a reaction base from which force may be exerted to move the two members relatively longitudinally in the other direction, and each of said canting plates being rotatable on a longitudinal shore axis relative to both of said shore members.

33. In a shore, two longitudinally, relatively movable members, a first canting plate surrounding one member, means for normally canting it to cause it to grip said member to prevent relative movement of the member in one direction, an auxiliary canting plate surrounding one of said members, means for maintaining it normally uncanted, the auxiliary canting plate being adapted to be canted to grip the member it surrounds and in its canted position being adapted to serve as a reaction base from which force may be exerted to move the two members relatively longitudinally in the other direction, and the first canting plate being rotatable on a longitudinal axis relative to both shore members.

34. In a shore, two longitudinally, relatively movable members, a first canting plate surrounding one member, means for normally canting it to cause it to grip said member to prevent relative movement of the member in one direction, an auxiliary canting plate surrounding one of said members, means for maintaining it normally uncanted, the auxiliary canting plate being adapted to be canted to grip the member it surrounds and in its canted position being adapted to serve as a reaction base from which force may be exerted to move the two members relatively longitudinally in the other direction, and the auxiliary canting plate being rotatable on a longitudinal axis relative to both shore members.

35. In a shore, upper and lower longitudinally relatively movable members, and a clutch device comprising a canting plate rotatable about a longitudinal shore axis, relative to both members, the plate being normally uncanted and adapted to be canted to grip the lower member, the plate and the upper member being relatively positioned so that a straight simple bar as a lever may be fulcrumed on the plate and may engage the upper member to raise said member to extend the length of the shore.

36. In a shore, two members longitudinally relatively movable to adjust the overall length of the shore, a clutch device for locking the two members against relative movement in the direction to shorten the shore, the said device comprising a canting plate having a perforation embracing one of the members, an abutment on the other member, a spring abutting upon the plate and disposed to rock the plate upon the abutment to cant it, the plate being generally circular whereby the plate may be rotated in its canted plane without disengaging it from the abutment, and the perforation being circular whereby the plate may be rotated in its canted plane without changing the canted angle and therefore without further compressing the spring.

37. In a shore, two members longitudinally relatively movable to adjust the overall length of the shore, a clutch device for locking the two members against relative movement in the direction to shorten the shore, the said device comprising a canting plate having a perforation embracing one of the members, an abutment on the other member, a helical spring surrounding the embraced member and abutting the plate and disposed to rock the plate upon the abutment to cant it, the plate being generally circular whereby the plate may be rotated in its canted plane without disengaging the abutment, and the perforation being circular whereby the plate may be rotated in its canted plane without changing the canted angle and therefore without changing the degree of compression of the spring.

RALPH R. ROEMER.

CERTIFICATE OF CORRECTION.

Patent No. 1,922,747.  August 15, 1933.

RALPH R. ROEMER.

It is hereby certified that error appears in the printed specification of the above numbered patent requiring correction as follows: Page 2, line 70, for "Bolt" read Bolts; and line 109, for "bolt" read bolts; page 4, line 75, claim 5, before "between" insert midway; and line 114, claim 7, after "position" insert and; page 6, line 68, claim 23, for "canned" read canted; and that the said Letters Patent should be read with these corrections therein that the same may conform to the record of the case in the Patent Office.

Signed and sealed this 14th day of November, A. D. 1933.

F. M. Hopkins (Seal)  Acting Commissioner of Patents.